May 28, 1929. H. J. SWANSON. GRINDER. Re. 17.311

Original Filed March 1, 1920 3 SHEETS—SHEET 1.

Witness
G. H. Hauck.

Inventor
Harry J. Swanson
By Edward N. Pagelsen
Attorney

May 28, 1929. H. J. SWANSON. Re. 17,311

GRINDER.

Original Filed March 1, 1920

3 SHEETS—SHEET 2.

Witness
A. D. Hauk

Inventor
Harry J. Swanson

By
Edward N. Pagelsen
Attorney

May 28, 1929. H. J. SWANSON. Re. 17,311

GRINDER.

Original Filed March 1, 1920 3 SHEETS—SHEET 3.

Witness
G. D. Hauk

Inventor
Harry J. Swanson
By Edward N. Pagelsen
Attorney

Reissued May 28, 1929. Re. 17,311

UNITED STATES PATENT OFFICE.

HARRY J. SWANSON, OF DETROIT, MICHIGAN, ASSIGNOR, BY MESNE ASSIGNMENTS, TO CINCINNATI GRINDERS INCORPORATED, OF CINCINNATI, OHIO, A CORPORATION OF OHIO.

GRINDER.

Original No. 1,364,006, dated December 28, 1920, Serial No. 362,336, filed March 1, 1920. Application for reissue filed August 14, 1926. Serial No. 129,294.

This invention relates to a centerless grinding machine in which the work is supported and rotated and may be moved axially without the aid of positively driven work supporting centers, and the chief object of the invention is to provide a structure which will cause a noncylindrical piece of work to be ground to a cylindrical form.

This invention further consists in a work holder comprising blades, plates or guides adapted to engage and guide cylindrical blanks along the grinding surface of a grinding wheel, and supporting mechanism for the guides whereby they may be rotated on an axis, parallel to the axis of the work.

It further consists in providing a supporting mechanism for said guides which will permit the guides to be rotated as a unit about an axis substantially perpendicular to the axis of the work.

It also consists in providing means for moving this rotatable guide toward and from the wheel.

It also consists in the details of construction illustrated in the accompanying drawings and particularly pointed out in the claims.

Figure 1:
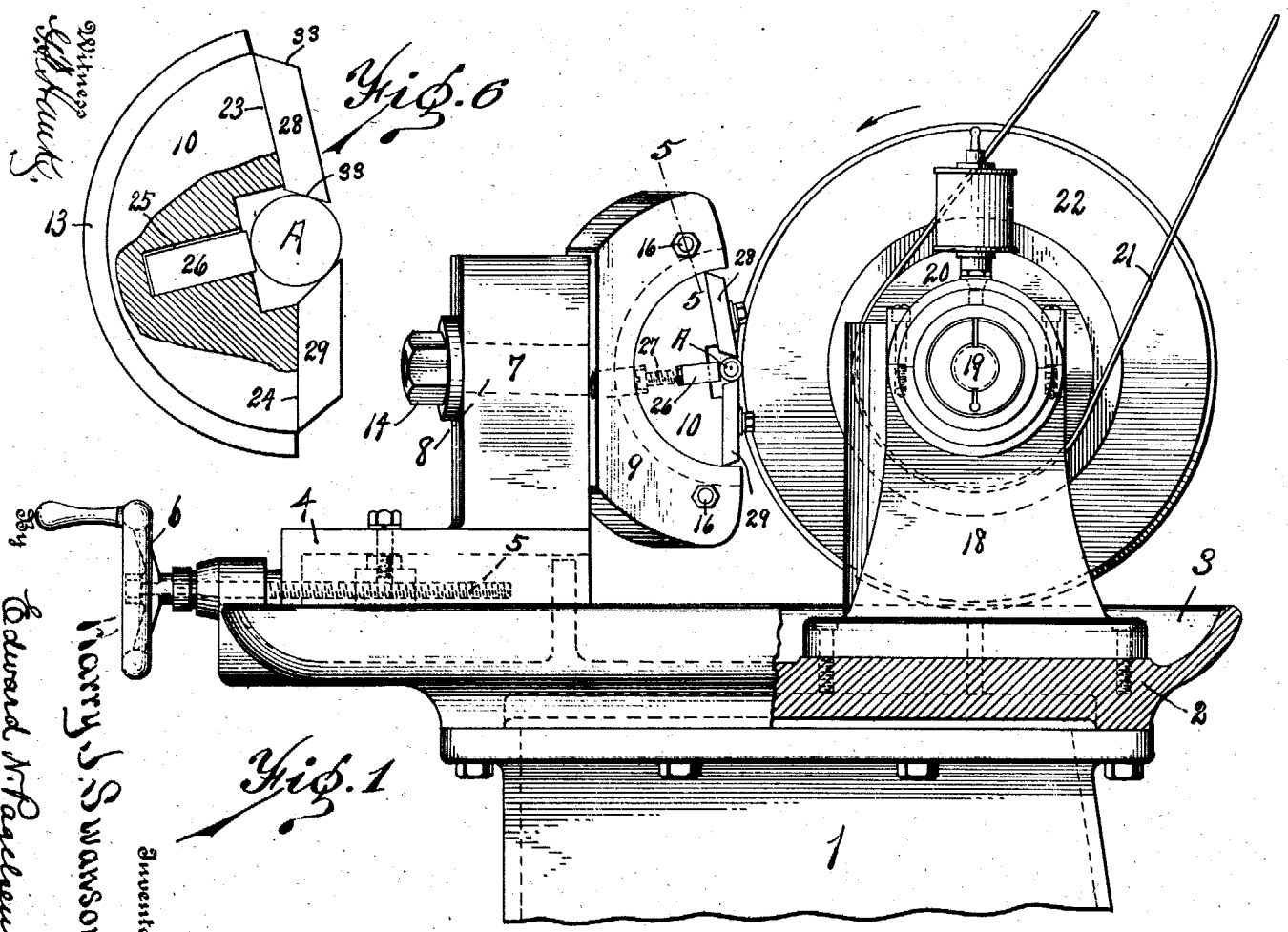
Figure 2:
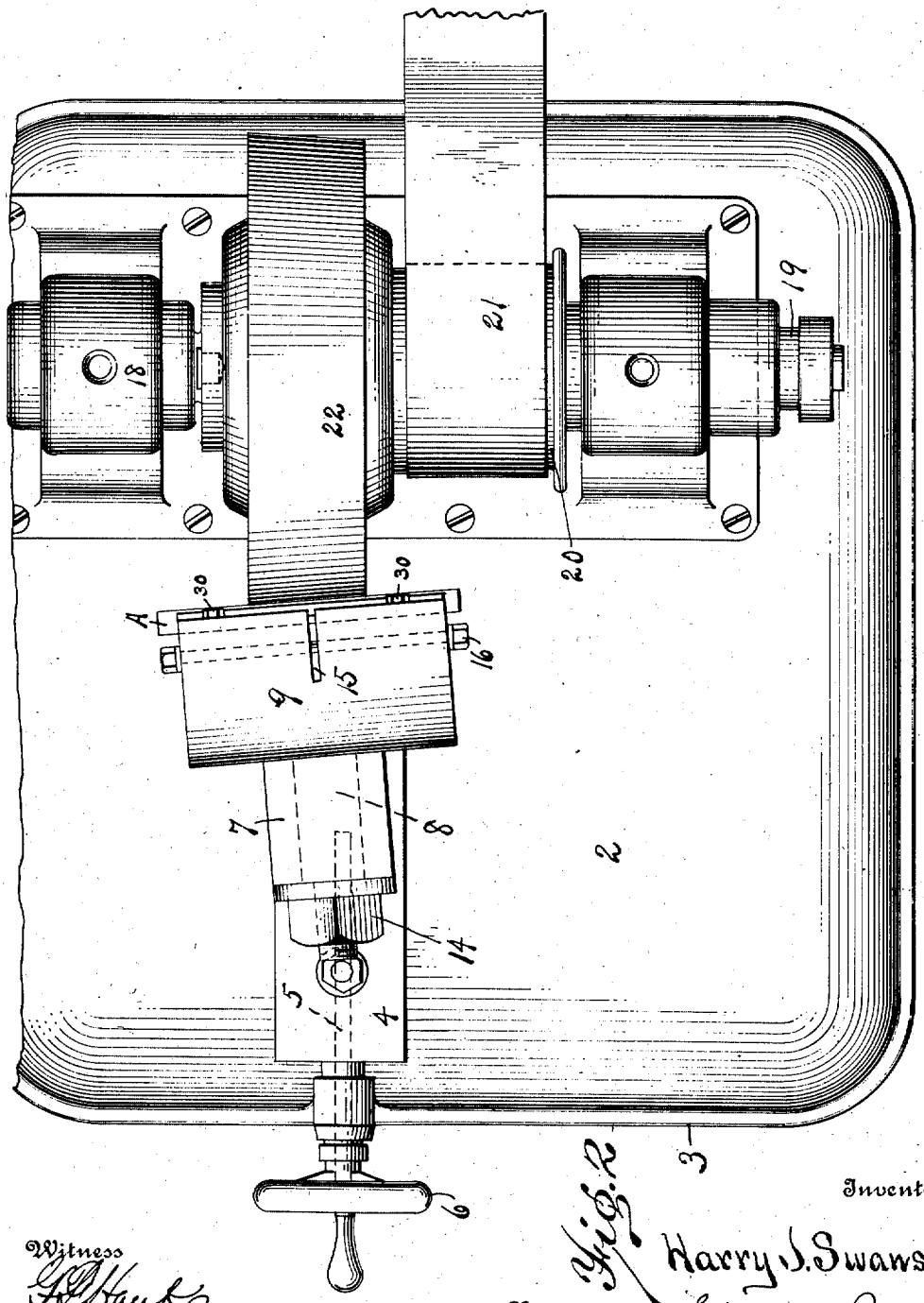
Figure 3:
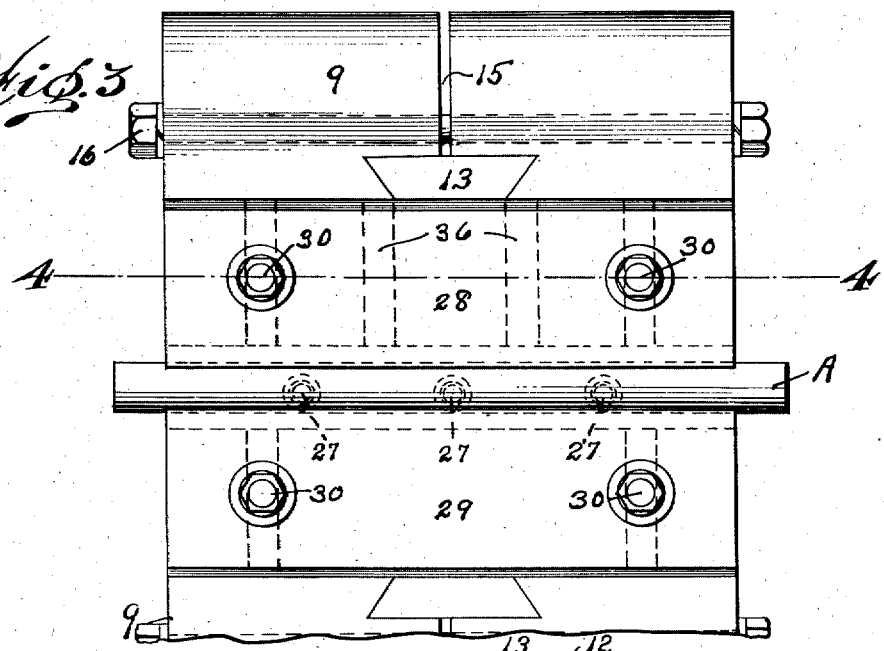
Figure 4:
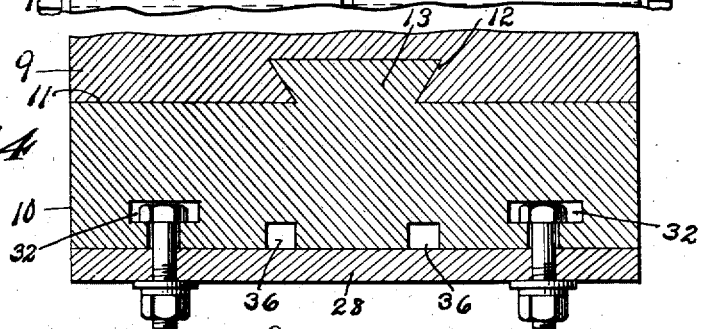
Figure 5:
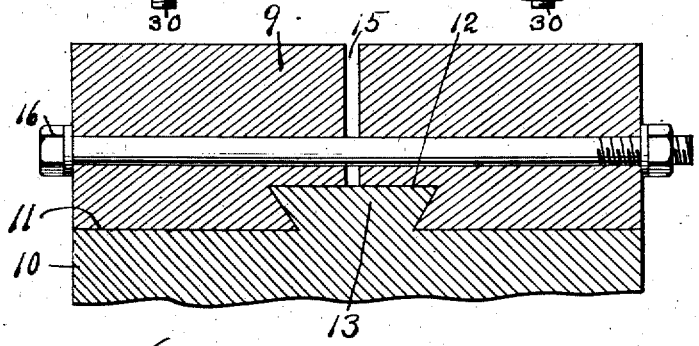

In the accompanying drawings, Figure 1 is a side elevation of this improved grinding machine with a portion of the table broken away to show the method of attaching thereto the pedestals for the grinding wheel arbor. Fig. 2 is a plan of the grinding machine. Fig. 3 is an elevation of the work holder or guide block. Fig. 4 is a section on the line 4—4 of Fig. 3. Fig. 5 is a section on the line 5—5 of Fig. 1 on a larger scale. Fig. 6 is an end elevation of the work holder on a larger scale.

Similar reference characters refer to like parts throughout the several views.

The grinding machine illustrated is of the same general character as that shown in Patent No. 1,106,803, granted August 11, 1914, to R. H. Grant, and is for the purpose of grinding cylindrical blanks such as the rollers of roller bearings, wrist pins of engines and other parts of machinery which must be as nearly perfect cylinders as possible. This machine, like that shown in the drawings, is adapted to grind these cylindrical blanks without the necessity of previously centering them and mounting them on centers.

The pedestal 1 shown in Fig. 1 has secured to it a table or platform 2 which is provided with a rim 3 along its outer edges to prevent the waste of the oil or other grinding liquid. A carriage 4 is slidable on the table by the screw 5 in a well known manner when the screw is turned by the handle 6. Projecting up from the carriage but forming a part thereof is a post 7 in which the shaft 8, which is indicated in dotted lines in Figs. 1 and 2, is rotatable. This shaft is rigidly connected to the support or chuck 9 for the guide block 10. The chuck 9 has a semi-cylindrical bearing surface 11 provided with a dove-tail groove 12 to receive the rib 13 on the guide block. A nut 14 on the shaft 8 locks the shaft, chuck and guide block from turning. The chuck is formed with vertical slots 15 across which the bolts 16 extend and are adapted to draw the metal on each side of these slots together and thus grip the rib 13 on the guide block and prevent it from rotating.

The pedestals 18 support an arbor 19 on which is mounted a pulley 20 for the driving belt 21 and the frusto-conical grinding wheel 22 which is turned in the direction of the arrow in Fig. 1. The shaft 8 is substantially radial to the face of this wheel and the axis of the guide block 10 is normally parallel thereto.

The guide block 10 is about a half cylinder, its faces 23 and 24 being cut back and inclined to form a very obtuse angle with each other. At the center of the cylinder the block is cut away to form a recess to receive the work A. The block also has a central groove 25 to receive the central back blade or guide 26 whose inner edge is at right angles to its parallel sides and which is properly adjusted by the screws 27, shown in dotted lines in Figs. 1 and 3.

The back blade or guide 26, the top blade 28, and the bottom blade 29 are preferably of hard steel, ground straight. The top and bottom work guides are formed with parallel faces and ends and are preferably secured to the guide block 10 by means of bolts 30 whose heads are slidable in the T-grooves 32 in the guide block. The outer side of the top guide should slant back from the plane of the outer side of the bottom blade about thirteen and one-half degrees and the angle between its parallel sides and its ends 33 is preferably sixty one and one-half degrees. These ends are made alike so that the guide may be reversed when worn. A clearance between the top guide and the work of about ten to fifteen one thousandths of an inch on rough work and about one half that for close work is desirable. The bottom guide also has parallel sides and the angle of its top and bottom edges is about forty five degrees to its sides. I prefer the angle between the bottom guide and the center or back guide to be about seventy six and one-half degrees.

Rotary movement of the guide block produces a variation in the co-efficient of friction because of the resultant of the pressures of the grinding wheel and the back guide resisted by the bottom guide. The center of the work and the center of rotation of the guide block should be the same and the line of contact of the grinding wheel is always the same for any position of the guide block. By turning the guide block to the left in Fig. 6, the friction of the work on the bottom blade is decreased. Turning the guide block moves the point of intersection of the plane of pressure between the work and wheel up and down the bearing edge of the back guide plate.

Assuming the work to be a polygon having a large number of sides, it will be noticed that by turning the guide block, it will be possible to obtain a position when an angle of the polygon will contact with the grinding wheel while a side of the polygon will contact with the end of the back guide. This will of course result in a minute flat taking the place of the angle and further results in a polygon in which the number of sides becomes so great that practically perfectly round work is obtained. I have found that to obtain this perfect work, the circumferential distance from the line of contact between the work and the grinding wheel to the line of contact between the work and the bottom blade should be such that it cannot be divided equally into the circumference of the work.

The grinding wheel causes the work to move endwise between the blades. By turning the guide block support on its shaft the rate of this feed may be varied, the slowest feed being had when the work and the arbor of the wheel are in the same plane.

The face 23 of the guide block may be formed with grooves 36 to constitute passages for the oil or other grinding liquid which flows to the rotating cylindrical work. The T-grooves 32 in this face also serve this purpose.

It will be understood that the work support may be used in connection with a cylindrical grinding wheel since the feed of the work is caused by the screw-like action of the grinding wheel upon the work when the work axis and the wheel axis do not lie in the same plane. Or it may be used in connection with a wheel which has its grinding surface on one side or at any angle between that of a flat disk and a cylinder.

The details of construction and the proportions of the parts may all be changed by those skilled in the art without departing from the spirit of my invention as set forth in the following claims.

I claim:—

1. A work holder comprising a guide block and plates adapted to engage and guide cylindrical blanks along the face of a grinding wheel, a shaft extending substantially radially to the face of the wheel and on which the guide block is mounted, and means rotatably supporting said shaft, said means comprising a carriage movable toward and from the grinding wheel, said guide block being formed substantially semi-cylindrical and said shaft being formed with a head having a semi-cylindrical recess in which said guide block is rotatably mounted.

2. A work holder comprising a substantially semi-cylindrical guide block having an axial groove and three guide plates mounted thereon to engage and guide cylindrical blanks along the grinding surface of a grinding wheel, the middle guide being at substantially right angles to one of the other guides which are attached to the flat sides of the guide block, one on each side of the axial groove.

3. A work holder comprising a substantially semi-cylindrical guide block having an axial groove and three guide plates mounted thereon to engage and guide cylindrical blanks along the grinding surface of a grinding wheel, the middle guide being at substantially right angles to one of the other guides which are attached to the flat sides of the guide block, one on each side of the axial groove, a shaft extending substantially radially of the face of the grinding wheel and on which the guide block is mounted, and means to rotatably support said shaft.

4. A work holder comprising a substantially semi-cylindrical guide block having an axial groove and three guide plates mounted thereon to engage and guide cylindrical blanks along the grinding surface of a grinding wheel, the middle guide being at substantially right angles to one of the other guides which are attached to the flat sides of the guide block, one on each side of the axial groove, a shaft extending substantially radially of the face of the grinding wheel and on which the guide block is mounted, means to rotatably support said shaft, said shaft being formed with a head having a semi-cylindrical recess to receive said guide block, and means to lock the guide block from turning in said recess.

5. In a centerless grinding machine having a grinding wheel, means to rotate the same, and a structure to support work in rotative relation to the peripheral face of the grinding wheel and to guide it axially across the face of the wheel, said structure including a supporting guide having an operative face to hold the work against the thrust of the grinding wheel which lies at an obtuse angle to a plane tangent to the work and passing through the line of contact of the work and the wheel, and a member to hold the work on the guide in operative contact with the grinding wheel, said supporting guide having its operative face so related to the grinding wheel that the circumferential distance from the line of contact of the work with said operative face to the line of contact of the work with the grinding wheel is not divisible equally into the circumferential distance around the work.

6. In a centerless grinding machine having a grinding wheel and a structure to hold work in operative relation therewith, said structure comprising a supporting guide having a face contacting with the work adjacent to the grinding wheel in such a position that the circumferential distance from the line of contact of the work and the grinding wheel to the line of contact of the work and the guide is not divisible equally into the circumferential distance around the work, and means to hold the work in rotative contact with said wheel and guide.

7. In a centerless grinding machine having a grinding wheel and a structure to hold work in operative relation therewith, said structure comprising a supporting guide having a face contacting with the work adjacent to the grinding wheel in such a position that the circumferential distance from the line of contact of the work and the grinding wheel to the line of contact of the work and the guide is not divisible equally into the circumferential distance around the work, means to hold the work in rotative contact with said wheel and guide, and means for varying the rate of axial feed of the work relative to the wheel.

8. A work holder comprising a guide block and three guide plates adapted to engage and guide cylindrical blanks along the grinding surface of a grinding wheel turning on a horizontal axis, the middle guide being at substantially right angles to the upper guide and at an angle of substantially seventy six and one-half degrees to the lower guide.

9. A work holder comprising a guide block and three guide plates adapted to engage and guide cylindrical blanks along the grinding surface of a grinding wheel turning on a horizontal axis, the middle guide being at substantially right angles to the upper guide and at an angle of substantially seventy six and one-half degrees to the lower guide, the bearing end of the middle guide being at right angles to its parallel sides and the bearing end of the lower guide being at an angle of substantially forty five degrees to its parallel sides.

10. A work holder comprising a guide block and three guide plates adapted to engage and guide cylindrical blanks along the grinding surface of a grinding wheel turning on a horizontal axis, the middle guide being at substantially right angles to the upper guide and at an angle of substantially seventy six and one-half degrees to the lower guide, the bearing end of the middle guide being at right angles to its parallel sides and the bearing end of the lower guide being at an angle of substantially forty five degrees to its parallel sides, and means to support the guides permitting them to turn as a unit about the axis of the blanks.

11. A work holder comprising a guide block and three guide plates adapted to engage and guide cylindrical blanks along the grinding surface of a grinding wheel turning on a horizontal axis, the middle guide being at substantially right angles to the upper guide and at an angle of substantially seventy six and one-half degrees to the lower guide, the bearing end of the middle guide being at right angles to its parallel sides and the bearing end of the lower guide being at an angle of substantially forty five degrees to its parallel sides, and means to support the guides permitting them to turn as a unit about an axis perpendicular to the face of the wheel in a radial plane thereof.

HARRY J. SWANSON.